US 6,651,943 B2

(12) United States Patent
Cho et al.

(10) Patent No.: US 6,651,943 B2
(45) Date of Patent: Nov. 25, 2003

(54) LCD MONITOR STAND

(75) Inventors: Chang-Ho Cho, Inchun (KR); Dae-Jin Kim, Koonpo (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/506,451

(22) Filed: Feb. 18, 2000

(65) Prior Publication Data

US 2003/0001053 A1 Jan. 2, 2003

(30) Foreign Application Priority Data

May 3, 1999 (KR) ........................................ 1999-15938

(51) Int. Cl.$^7$ ................................................ A47F 5/00
(52) U.S. Cl. .................... 248/122.1; 248/474; 248/917; 248/919; 361/683
(58) Field of Search ........................ 248/122.1, 125.1, 248/371, 462, 464, 472, 474, 681, 682, 917, 919; 361/683; 349/58

(56) References Cited

U.S. PATENT DOCUMENTS

| 236,371 A | * | 1/1881 | Somers ........................ 248/471 |
| 245,485 A | * | 8/1881 | Haff ............................ 248/471 |
| 250,229 A | * | 11/1881 | Gollner ....................... 248/470 |
| 253,457 A | * | 2/1882 | Wiederer ..................... 248/471 |
| 1,026,523 A | * | 5/1912 | Maxwell ...................... 248/464 |
| 1,113,034 A | * | 10/1914 | Miller ......................... 248/470 |
| 1,820,841 A | * | 8/1931 | Soref .......................... 248/463 |
| 3,908,955 A | * | 9/1975 | Frechtman ................... 248/470 |
| 3,990,670 A | * | 11/1976 | Frechtman ................... 248/470 |
| 5,098,056 A | * | 3/1992 | Alger et al. ................. 248/463 |
| 5,119,204 A | * | 6/1992 | Hashimoto et al. .......... 358/254 |
| 5,329,712 A | * | 7/1994 | Keller ........................ 40/152.1 |
| 5,397,081 A | * | 3/1995 | Landry et al. ............... 248/346 |
| 5,836,565 A | * | 11/1998 | Chang ......................... 248/456 |
| 5,927,676 A | * | 7/1999 | Lefton ........................ 248/472 |
| 6,003,260 A | * | 12/1999 | Chang ......................... 40/748 |
| 6,016,248 A | * | 1/2000 | Anzai et al. ................. 361/683 |
| 6,256,075 B1 | * | 7/2001 | Yang ........................... 348/843 |
| 6,301,101 B1 | * | 10/2001 | Anzai et al. ................. 248/688 |

FOREIGN PATENT DOCUMENTS

| DE | 4028645 | * | 3/1992 |
| JP | 2000-333100 | * | 11/2000 |
| WO | WO 92/03956 | * | 3/1992 |

OTHER PUBLICATIONS

Printout from the internet (web address: http://www.touch-screens.com/compare_lcd_crt.shtm), "Comparing Flat LCD Monitors and Traditional CRT Monitors", 4 pages (Dec. 12, 2001).

* cited by examiner

*Primary Examiner*—Kimberly Wood
*Assistant Examiner*—Naschica S. Morrison
(74) *Attorney, Agent, or Firm*—Robert E. Bushnell, Esq.

(57) ABSTRACT

A stand fixing structure of a LCD monitor is disclosed. The stand structure of the LCD monitor according to the present invention includes a rear cover, a VESA cover engaged to a back surface of the rear cover, a rotation plate rotatably engaged at a bottom of a circular groove grooved on a back surface of the VESA cover and having a certain diameter, a rotatable stand having both ends hinged to the rotation plate, and a pair of opposite hooks protruded from both corner portions of a back surface of the VESA cover, whereby the stand is rotated and fixed at the hooks, and when the LCD monitor is hanged on a wall, the stand is supported by the hooks for thereby preventing the LCD monitor from being inclined in a certain direction.

18 Claims, 5 Drawing Sheets

LCD MONITOR STAND

CLAIM OF PRIORITY

This application makes reference to, incorporates the same herein, and claims all benefits accruing under 35 U.S.C. §119 from my application entitled STRUCTURE FOR FIXING HANDLE OF L.C.D MONITOR earlier filed in the Korean Industrial Property Office on May 3, 1999 and there duly assigned Ser. No. 15938/1999.

BACKGROUND OF THE INVENTION

1. Field of the Invention

The present invention relates to a LCD monitor, and in particular to a LCD monitor stand which may be used as a hinge shaft and is capable of fixing the stand at a certain angle.

2. Description of the Background Art

A LCD monitor is a display apparatus capable of visually changing an optical characteristic of a liquid crystal by varying a molecular arrangement by applying a voltage to a liquid crystal.

The above-described LCD monitor is used for a major electronic appliance such as a television set, a computer, a video camera, etc. The size of the same becomes compact and portable. In addition, a power consumption thereof is decreased.

In particular, since the size of a computer and television LCD monitor becomes compact, the computer and television LCD monitor is installed upright on a desk using a stand or is hanged on a wall. The above-described stand is hingedly installed at a video electronics standard association (VESA) cover engaged at a rear side of the LCD monitor.

However, LCD monitor stands additionally need a hinge shaft, the assembling process is complicated, and the fabrication cost is increased. In addition, when the LCD monitor is hanged on a wall using the stand, the lower portion of the LCD monitor is inclined in a direction of the wall due to the weight of the LCD monitor, so that a viewer can not look at the monitor in a proper direction.

SUMMARY OF THE INVENTION

Accordingly, it is an object of the present invention to provide a stand for a LCD monitor which is capable of simplifying a fabrication process using a hinge shaft and preventing a LCD monitor from being inclined.

To achieve the above objects, there is provided a stand fixing structure for a LCD monitor which includes a rear cover, a VESA cover engaged to a back surface of the rear cover, a rotation plate rotatably engaged at a bottom of a circular groove grooved on a back surface of the VESA cover and having a certain diameter, a rotatable stand having both ends hinged to the rotation plate, and a pair of opposite hooks protruded from both corner portions of a back surface of the VESA cover, whereby the stand is rotated and fixed at the hooks, and when the LCD monitor is hanged on a wall, the stand is supported by the hooks for thereby preventing the LCD monitor from being inclined in a certain direction.

In the present invention, a rotation plate has both ends which are bent for thereby forming a bent portion thereat, and a hinge hole is formed at a bent portion, and both ends of the stand are bent at a certain angle and pass through the hinge hole and become rotatable.

In addition, a fixing nut is fixed at both ends of the stand, and both ends of the stand are movable in an inner direction of the rotation plate, and the movement of the same in an outer direction of the rotation plate is restricted.

A pair of hooks each are formed of a vertical portion vertically protruded from an upper surface of the VESA cover, and a horizontal portion horizontally protruded from an upper portion of the vertical portion, so that a stand is engaged in an inner space formed by the vertical portion and horizontal portion.

In the stand of the LCD monitor according to the present invention, the assembling process is simple because the stand is used as a hinge shaft, and the fabrication cost is decreased.

Since a hook is provided, when hanging a LCD monitor on a wall, it is possible to prevent the LCD monitor from being inclined in a certain direction.

Additional advantages, objects and features of the invention will become more apparent from the description which follows.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
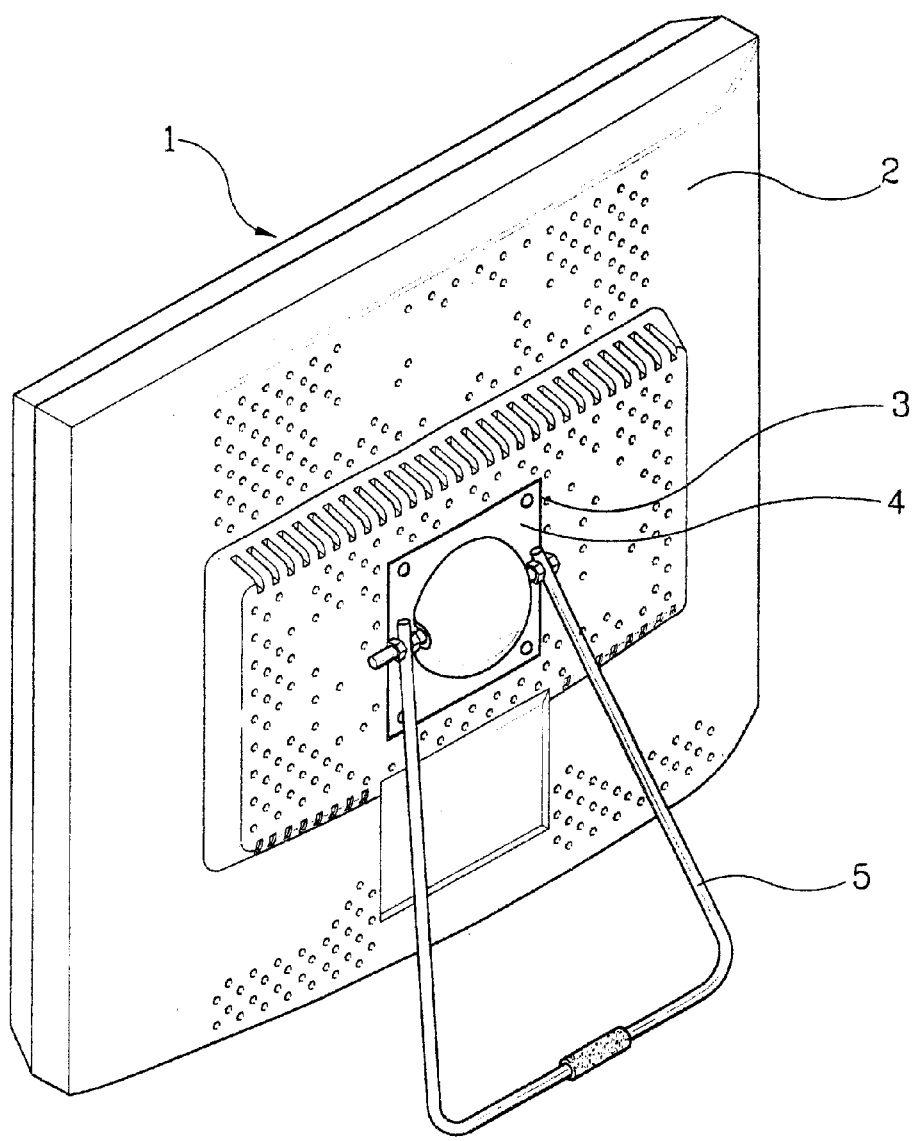
FIG. 1 is a perspective view illustrating a construction that a stand is engaged at a back surface of a conventional LCD monitor.
Figure 2:
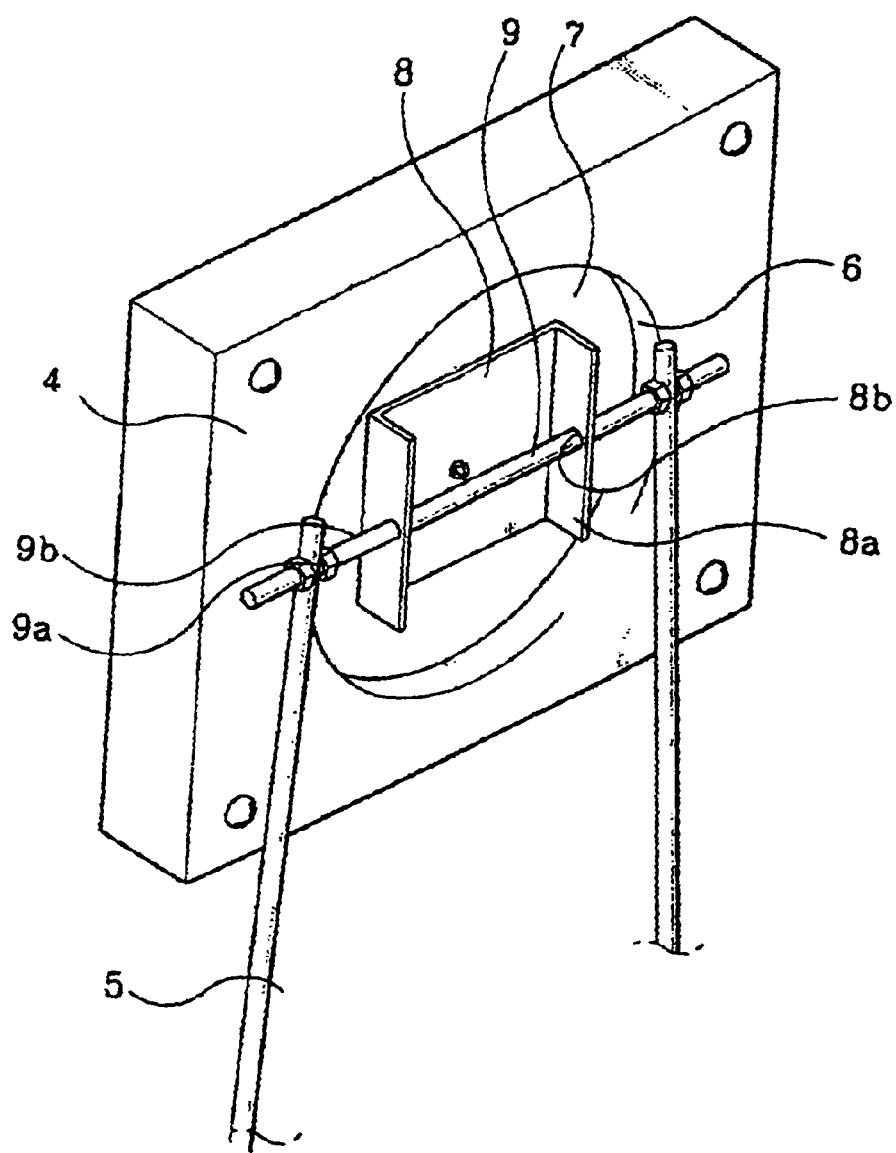
FIG. 2 is an enlarged perspective view illustrating a construction that a stand for a conventional LCD monitor is engaged at a VESA cover by a hinge shaft.

FIG. 1 is a perspective view illustrating a state that a stand is engaged at a rear portion of the LCD monitor, and FIG. 2 is an enlarged perspective view illustrating a state that a stand of a conventional LCD monitor is engaged at a VESA cover by a hinge shaft.

As shown therein, a rectangular groove 3 is formed at a rear intermediate portion of a rear cover 2 of a LCD monitor 1, and a VESA cover 4 is engaged into the rectangular groove 3. A stand 5 is hinged to the VESA cover 4, so that the LCD monitor 1 is fixed at a certain angle by properly widening the stand 5.

The VESA cover 4 is formed in a rectangular plate shape and has a circular groove 6 formed at a certain side. In addition, a rotation plate 8 is rotatably installed at a bottom 7 of the circular groove 6. A bent portion 8a is formed at both ends of the rotation plate 8 in a vertical direction. A through hole 8b is formed at the bent portion 8a. A hinge shaft 9 is hingedly engaged in the through hole 8b. In addition, both ends 9b of the hinge shaft 9 pass through a hinge hole(not shown) formed at both ends of the stand 5 and are fixed by a pair of nuts 9a. Therefore, the stand 5 is integrally connected with the hinge shaft 9 and is rotatable in a clockwise direction or counterclockwise direction by the rotation plate 8.

Figure 3:
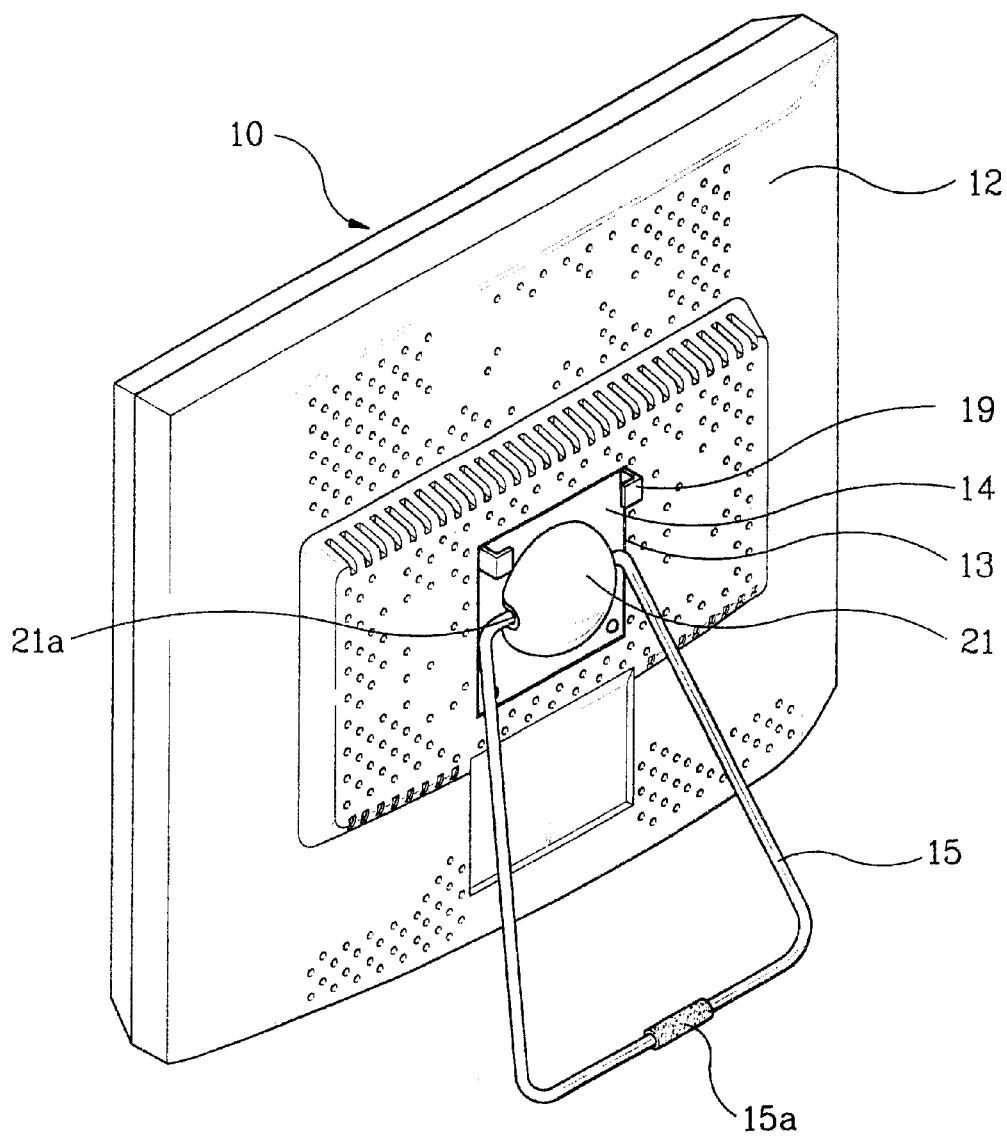
FIG. 3 is a perspective view illustrating a construction that a stand is engaged at a back surface of a LCD monitor according to the present invention.

FIG. 3 is a view illustrating a construction that a stand is engaged at a back surface of a LCD monitor according to the present invention. As shown therein, a rectangular groove 13 is formed at a back surface intermediate portion of a rear cover 12 of a LCD monitor 10, and a VESA cover 14 is engaged in the rectangular groove 13. A stand 15 is hinged at the VESA cover 14. The stand 15 is shaped in a U-shape and is formed of a certain elastic material such as a stainless steel. A circular pad 15a formed of a rubber material is engaged at a bottom side. Therefore, the stand 15 does not slide.

In addition, a pair of opposite hooks 19 are protruded at both upper corner portions of a back surface of the VESA cover 14. Therefore, since the stand 15 is fixed in the interior of the hooks 19 when the LCD monitor is hanged on a wall 20, the LCD monitor is prevented from being inclined at a certain angle.

Figure 4:
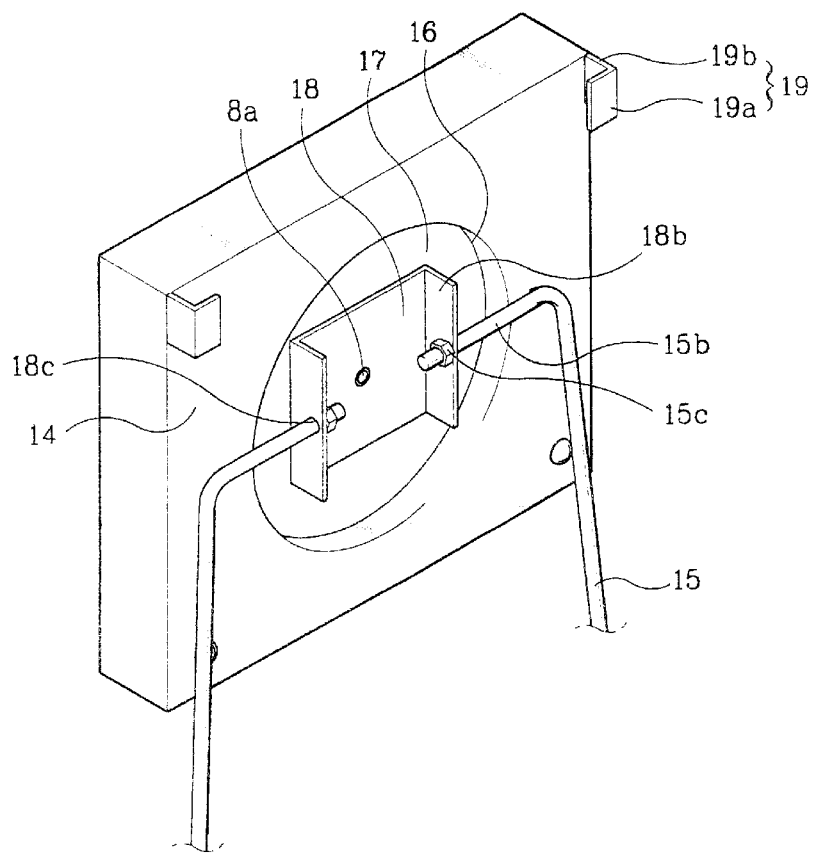
FIG. 4 is an enlarged perspective view illustrating a construction that a stand for a LCD monitor is hingedly engaged at a VESA cover according to the present invention.
Figure 5:
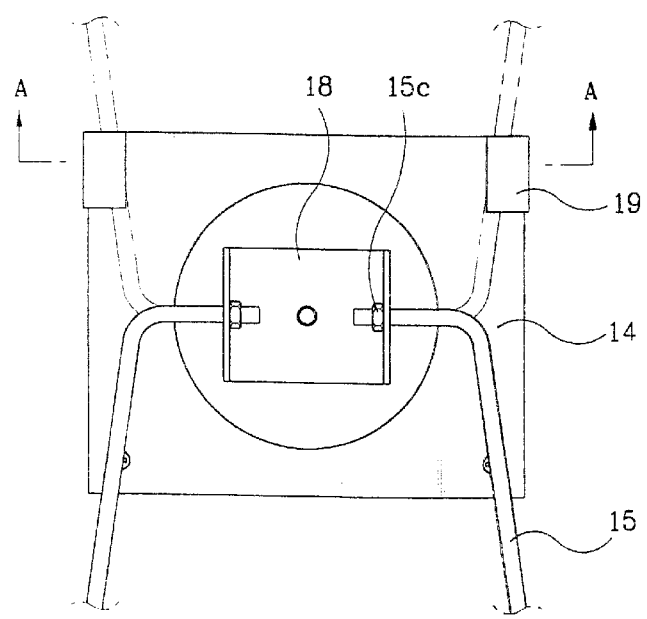
FIG. 5 is a plan view illustrating a construction that a stand for a LCD monitor is hingedly engaged at a hook of a VESA cover according to the present invention.

As shown in FIGS. 4 and 5, the construction that the stand is fixed at the VESA cover will be explained in detail. The VESA cover 14 is formed of a rectangular plate. A circular groove 16 having a certain diameter is formed at one side of the same. A rotation plate 18 is rotatably engaged at a bottom 17 of the circular groove 16 by a screw 8a. Therefore, the rotation plate 18 is rotatable in a clockwise direction or a counterclockwise direction.

In addition, both ends of the rotation plate 18 are bent in a vertical direction for thereby forming a bent portion 18b. A hinge hole 18c is formed at a certain portion of the bent portion 18b. Both ends of the stand 15 pass through the hinge hole 18c. In addition, a fixing nut 15c is engaged at both ends 15b of the stand 15, respectively, and contacts with an inner side of the bent portion 18b. Therefore, both ends 15b of the stand 15 are elastically movable in a center direction of the rotation plate 18, and the movement of both ends 15b of stand 15 is restricted in the opposite direction by the fixing nut 15c.

When the stand 15 is fixed by the rotation plate 18, a semicircular cap 21 (FIG. 3) seals the circular groove 16 of the VESA cover 14. Therefore, the stand 15 is exposed to the outside through a hole 21a formed at both sides of the cap 21.

Figure 6:
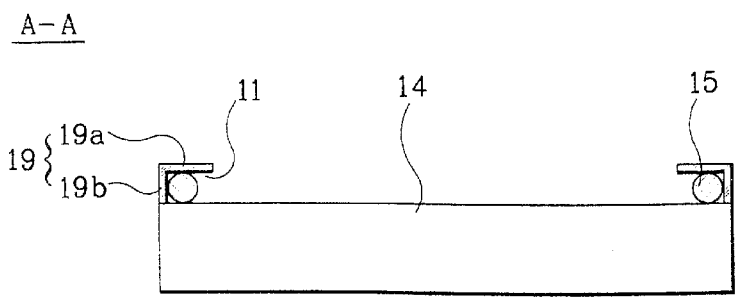
FIG. 6 is a cross-sectional view taken along line A—A of FIG. 5.
Figure 7:
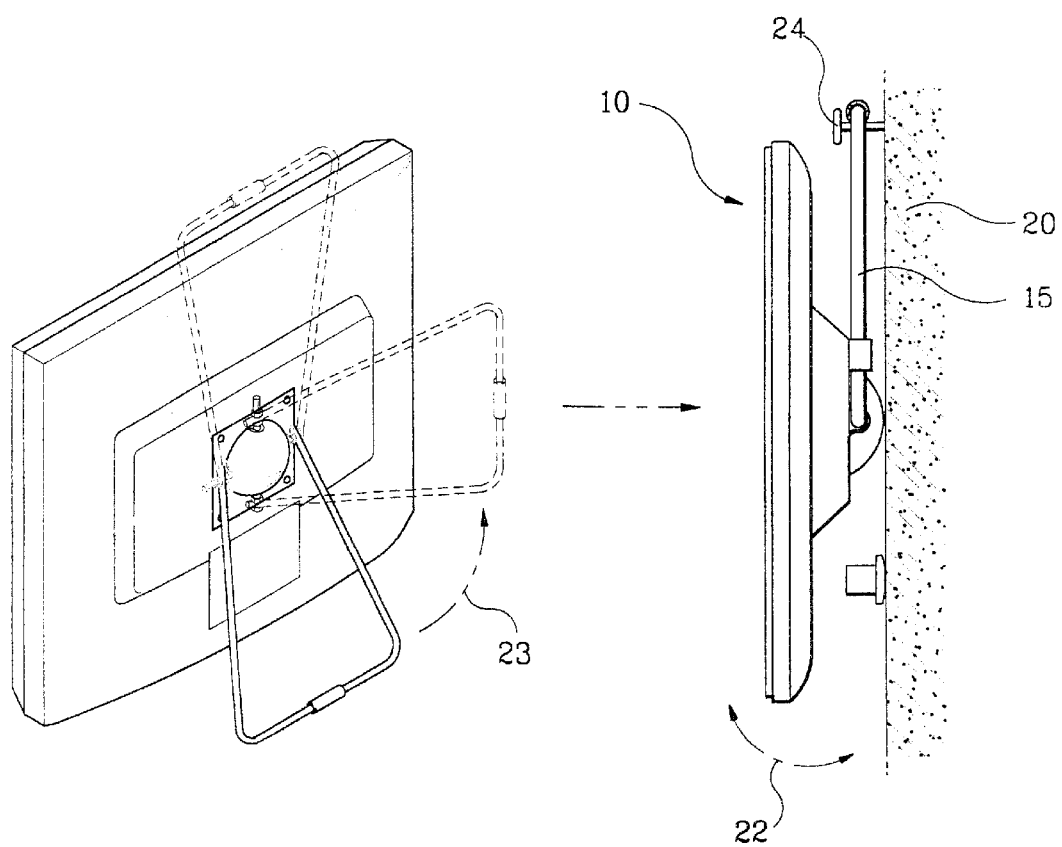
FIGS. 7A and 7B is a side view illustrating a construction that a stand of a LCD monitor is hanged on a wall according to the present invention.

As shown in FIG. 6, the hooks 19 protruded at both upper corner portions of the VESA cover 14 each are shaped in an inverted L shape and are opposite to each other. Namely, a pair of the hooks 19 are formed of a vertical portion 19b protruded in a vertical direction with respect to an upper surface of the VESA cover 14 and a horizontal portion 19a protruded in a horizontal direction from an upper surface of the vertical portion. In addition, a pair of the hooks 19 each include a certain space 11 therein. The spaces 11 are opposite to each other. Therefore, the stand 15 is fixedly inserted into the spaces 11. When the LCD monitor is hanged on a wall, it is possible to prevent a lower portion of the LCD monitor 10 from being inclined with respect to the wall.

The operation of the stand of the LCD monitor according to the present invention will be explained with reference to the accompanying drawings. As shown in FIGS. 3 through 7B, in the case that the LCD monitor 10 is installed on a desk, the stand 15 is pulled back from the back surface of the LCD monitor 10. At this time, since both ends 15b of the stand 15 are hingedly engaged to the hinge hole 18c of the rotation plate 18, the stand 15 is widened at a certain angle. Therefore, the LCD monitor 10 maintains a certain balance and is installed at a certain angle. At this time, since the circular pad 15a friction-contacts on the upper surface of the desk, LCD monitor 10 will not slide.

In the case that the LCD monitor 10 is installed upright, the stand 15 is rotated in a counterclockwise direction in a direction of a first arrow direction 23 by an external force. This external force is applied to the bent portion 18b of the hinge plate 18 through both ends 15b of the stand 15 for thereby rotating the rotation plate 18 in a counterclockwise direction. Therefore, since the stand 15 is rotated in a counterclockwise direction at an angle of 90°, it is possible to install the LCD monitor 10 uprightly.

In the case that the LCD monitor 10 is hanged on a wall 20, the stand 15 is rotated in a counterclockwise direction or clockwise direction in accordance with the first arrow direction 23 and then is positioned at an upper portion of the hook 19. In addition, an external force is applied to the stand 15, and both ends 15b of the stand 15 are moved in a center direction through the hinge hole 18c of the rotation plate 18.

When the distance of the stand 15 is smaller than the distance between the hooks 19, the stand 15 is positioned between the hooks 19, and an external force applied to the stand 15 is released. Therefore, the stand 15 elastically moves in an opposite direction of the center through the hinge hole 18c, so that the stand 15 is inserted into the space 11 formed in the hooks 19. In addition, the stand 15 is prevented from being moved by the fixing nut 15c.

After the stand 15 is fixed at the hooks 19, when it is hanged at a support member 24 such as a nail of the wall 20, since the stand 15 contacts with an inner surface of the horizontal portion 19a of the hook 19, it is possible to prevent the LCD monitor from being inclined in the direction of the wall along a second arrow direction 22.

As described above, in the stand fixing structure of the LCD monitor according to the present invention, it is possible to implement a simple assembling process using the stand as a hinge shaft, and the fabrication cost is decreased. In addition, since the hooks are used, when the LCD monitor is hanged on a wall, it is possible to prevent the LCD monitor from being inclined with respect to the wall.

The present invention is not limited to the embodiment shown in the drawings, and it is apparent that various changes and other equivalent embodiments may be effected by those skilled in the technical art related to the present invention. Thus, the proper scope of technical protection of the present invention should be set up within the technical spirit of the accompanying claims.

What is claimed is:

1. A stand fixing structure for a LCD monitor, said LCD monitor having a display on a front side, said LCD monitor having a rear side opposite said front side, said stand fixing structure comprising:
   a VESA cover engaged to a back surface of the rear side of said LCD monitor;
   a rotation plate rotatably engaged at a bottom of a circular groove disposed on said back surface of the VESA cover and having a certain diameter;
   a rotatable stand hingedly attached to the rotation plate, wherein the stand is rotatable between a first and a second position; and a pair of opposite hooks protruding from corner portions of said back surface of the VESA cover, said stand being attached to said rotation plate at first and second points on said stand, said hooks being attached to said stand at third and fourth points on said stand when said stand is in said second position, said third and fourth points being further away from a nearest of two terminal ends of said stand than either of said first and second points, and when the LCD monitor is hung on a wall, the stand is supported by the hooks thereby preventing the LCD monitor from being inclined.

2. The structure of claim 1, wherein both ends of the rotation plate are bent forming a bent portion, and a hinge hole is formed at the bent portion, and both ends of the stand are bent at a certain angle and are rotatably fixed through the hinge hole.

3. The structure of claim 2, wherein a fixing nut is engaged at both ends of the stand, and the both ends of the stand contact with an inner surface of the bent portion of the rotation plate, so that both ends of the stand are movable in an inner direction of the rotation plate, and the movement of both ends of the stand in an outer direction of the rotation plate is restricted.

4. The structure of claim 1, wherein said pair of hooks each includes a vertical portion protruded in a vertical direction from an upper surface of one side of the VESA cover, and a horizontal portion protruded in a horizontal direction from an upper portion of the vertical portion, so that the stand is inserted into an inner space formed by the vertical portion and the horizontal portion of said hook.

5. A method of mounting an LCD monitor to a wall, comprising the steps of:

inserting ends of a U-shaped elastic material into holes in a rotation plate;

attaching fixing nuts to internal portions of said rotation plate allowing both ends of said U-shaped elastic material to be squeezed together while restricting further separation of both ends of said U-shaped elastic material from each other;

rotating said U-shaped elastic material connected to said rotation plate on a back side of said LCD monitor until said U-shaped elastic material aligns with a pair of hooks;

squeezing together portions of said U-shaped elastic material mountably attached to said LCD monitor;

placing said portions of said U-shaped elastic material into said pair of hooks mounted on said back side of said LCD monitor;

releasing said portions of said U-shaped elastic material so that said U-shaped elastic material is locked within said pair of hooks;

partially inserting a nail into said wall; and hanging said LCD monitor from said wall by hanging a middle portion of said U-shaped material from said nail.

6. The method of claim 5, further comprising the step of placing a cover over end portions of said U-shaped material.

7. A stand for an LCD monitor, comprising:

a video electronics standard association (VESA) cover for a back side of said LCD monitor;

a U-shaped rotation plate rotatably attached to said VESA cover, each end of said U-shaped rotation plate being perforated by a hole; and a U-shaped elongated elastic metal tube attached to said rotation plate, said tube being capable of supporting said LCD monitor on a surface; and a pair of fixing nuts disposed on each end of said metal tube, each hole allowing passage of said metal tube, each hole preventing passage of respective ones of said fixing nuts attached to said tube and allowing squeezing together of said ends of said tube while preventing separation of both ends of said tube and preventing detachment of said tube from said rotation plate.

8. The stand of claim 7, further comprising a pair of hooks located at opposite ends of said VESA cover for locking into place said tube.

9. The stand of claim 8, said pair of fixing nuts for attaching said tube to said rotation plate, said fixing nuts being located on an inside of said U-shaped rotation plate allowing the ends of said U-shaped tube to be squeezed together.

10. The stand of claim 9, said tube having a straight portion in the middle of said U-shaped tube, said straight portion containing a circular friction pad for propping up said LCD monitor on said surface.

11. The stand of claim 10, said pair of hooks being located in such a position so as to lock into place said U-shaped tubing if ends of said U-shaped tube are squeezed together, placed within said hooks, and then released.

12. The method of claim 5, wherein said portions of said U-shaped elastic material that are placed in said pair of hooks are located substantially inward from said ends of said U-shaped elastic material.

13. The method of claim 5, wherein said portions of said U-shaped elastic material that are placed in said pair of hooks are located substantially inward from said ends of said U-shaped elastic material.

14. The stand of claim 8, said metal tube attaches to said pair of hooks at a location on said metal tube that is between locations of where said metal tube attaches to said rotation plate.

15. The method of claim 5, said elastic material attaches to said pair of hooks at a location on said elastic material that is between locations where said elastic material attaches to said rotation plate.

16. The method of claim 5, said elastic material being attached to said holes on said rotation plate by a pair of fixing nuts disposed on said elastic material, said holes of said rotation plate allowing said elastic material to be squeezed together while preventing said pair of fixing nuts attached to said elastic material from passing through.

17. The structure of claim 1, said ends of said stand having a pair of fixing nuts attached thereto, said rotation plate being perforated by a pair of holes allowing said stand to pass through said holes but preventing said fixing nuts attached to said stand from passing through allowing squeezing together of said ends of said stand but preventing prying apart said ends of said stand.

18. The stand of claim 8, said tube attaches to each of said pair of hooks at a location on said tube between locations where said tube attaches to said rotation plate.

* * * * *